Nov. 28, 1950     A. V. L. C. DEBRIE     2,531,558

GRAVITY-OPERATED FRICTION MEANS

Filed Sept. 19, 1945

Inventor:
A. V. L. C. Debrie
By E. F. Wenderoth
Atty

Patented Nov. 28, 1950

2,531,558

UNITED STATES PATENT OFFICE 2,531,558

GRAVITY-OPERATED FRICTION MEANS

André Victor Leon Clement Debrie, Paris, France

Application September 19, 1945, Serial No. 617,396
In France July 12, 1943

Section 1, Public Law 690, August 8, 1946
Patent expires July 12, 1963

1 Claim. (Cl. 64—30)

It is known that in a very large number of cases, the film-driving devices using gravity-operated friction means can only work when properly lubricated. Now, in different applications which require a lubrication as perfectly constant as possible, this lubrication constitutes a problem which it is difficult to solve. Such is the case, for instance, for gravity-operated friction means used in machines using kinematographic films such as view-taking apparatuses, printing machines, developing machines, projectors with a view to ensuring a proper winding of the film.

The present invention has for its object a device for achieving a lubrication which remains constant and unchanging and it is characterized by the fact that one of the two cooperating frictional parts is covered with spongy material, such as felt or cloth, serving as a carrier for the lubricant which may be oil for instance, said lubricant being thus retained by the material considered. On the other hand all steps should be taken for ensuring as perfect an application as possible of the covering material on the frictional part considered. The invention provides in particular for securing means wherein the lengthening of the spongy material is compensated for by a spiral spring to which is secured one of the ends of the covering material.

A form of embodiment of the invention as applied to a gravity friction system, as known in the kinematographic industry, is shown by way of example in the accompanying drawings wherein.

Figure 1:
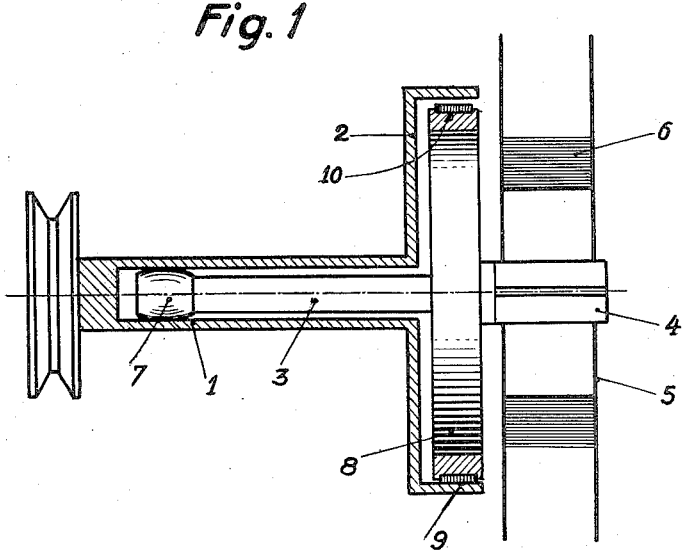
Fig. 1 is a side view, partly cross-sectional of the device.
Figure 2:
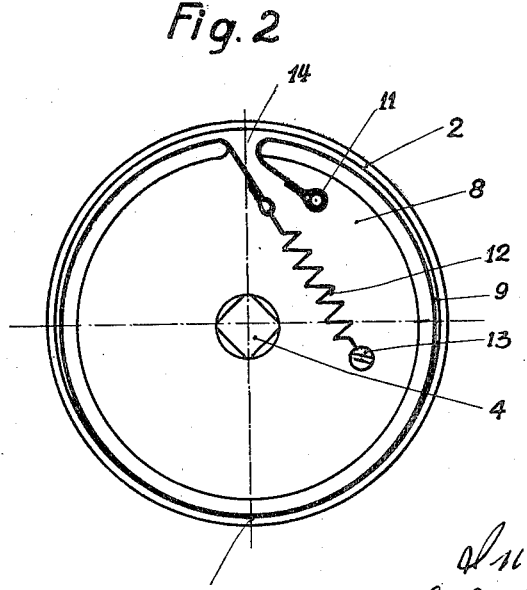
Fig. 2 is an elevational end view thereof.

The driving shaft 1, controlled by a suitable mechanism, not shown, appears under the form of a socket ending with the driving drum 2. The driven shaft 3, ending with a square stub shaft 4 passing through the spool 5 carrying the film 6 of which it ensures the rotation, engages the socket in 1 and carries at its end a barrel-shaped part 7 tangent to said socket in 1. On the other hand, the shaft 3 carries between the barrel-shaped part 7 and the square stub-shaft 4, a drum 8 of any suitable material, housed within the drum 2. The drum 8 shows at its periphery a groove 10 inside which is fitted a packing 9 of felt or of cloth which is saturated with oil and through which the friction between the drums 8 and 2 takes place, the packing being thus held through its sides.

In the form of embodiment shown, one of the ends of the packing 9 is secured at 11 to the drum 8, while its other end is attached to a spiral spring 12 secured at 13 to the drum 8. The securing points 11 and 13, as well as the spring 12, are arranged inside the drum 8 which is provided with a slot 14 for the passage of the ends of the packing or covering material 9. It is apparent that through this arrangement, the packing 9 remains perfectly applied against the periphery of the drum 8 whatever its variation in length may be. It is obvious that the manner of securing the packing may be replaced by any other device producing the same results.

The operation is as follows: under the action of the weight of the spool 5 of the film 6, the shaft 3 oscillates about its bearing point 7 and the drum 8 bears through its packing 9, tightly applied on said drum, against the inner surface of the drum 2. The pressure exerted depends on the amount of film 6 already wound on the spool and ensures the driving of the latter when the drum 2 is started by the mechanism of the machine. The spongy material saturated with oil ensures a remarkably constant friction whatever may be its state of lubrication.

What I claim is:

In a gravity operating friction means working under lubrication chiefly for kinematographic apparatuses, two parts of corresponding forms in friction driving relation and a packing of spongy material saturated with a lubricant and covering the surface of one of said parts, one end of said packing being fixed to a point inside of said part and the other end of said packing being connected by means of elastic means to another point inside of said part, said packing constituting the friction surface of said part cooperating with the friction surface of said other part.

ANDRÉ VICTOR LEON CLEMENT DEBRIE.

REFERENCES CITED

The following references are of record in the file of this patent:

UNITED STATES PATENTS

| Number | Name | Date |
|---|---|---|
| 1,240,560 | Gilmore | Sept. 18, 1917 |
| 2,343,961 | Del Valle | Mar. 14, 1944 |

FOREIGN PATENTS

| Number | Country | Date |
|---|---|---|
| 896,318 | France | of 1944 |